May 5, 1964

P. PROFOS ETAL 3,131,863

METHOD AND APPARATUS FOR LIMITING A REGULATING IMPULSE

Filed Feb. 10, 1960

Inventors
PAUL PROFOS
WILHELM DIEKERS
KARL REINHARD

Attorneys

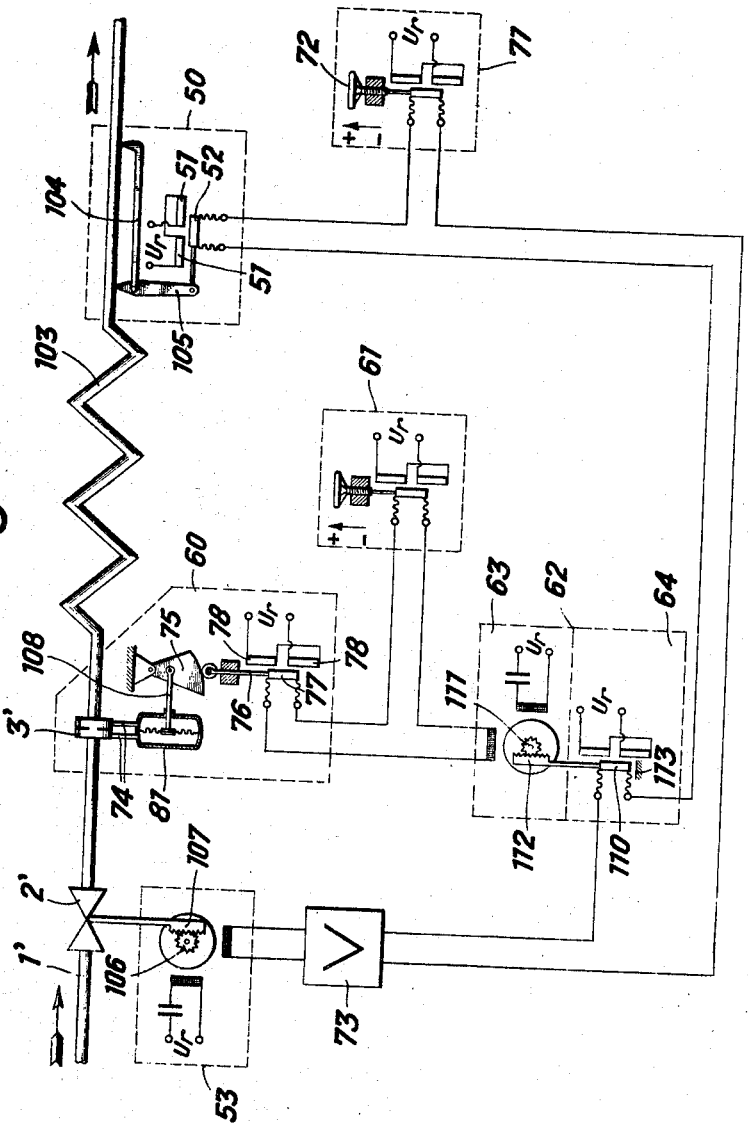

United States Patent Office 3,131,863
Patented May 5, 1964

3,131,863
METHOD AND APPARATUS FOR LIMITING A REGULATING IMPULSE
Paul Profos, Winterthur, Switzerland, and Wilhelm Diekers, Grevenbroich, Ortsteil Nauenhausen, and Karl Reinhard, Essen-Bredeney, Germany, assignors to Sulzer Freres, Societe Anonyme, Winterthur, Switzerland
Filed Feb. 10, 1960, Ser. No. 7,888
Claims priority, application Switzerland Feb. 13, 1959
2 Claims. (Cl. 236—78)

This invention relates to a method and apparatus for limiting a signal, for example a signal representative of an operational variable in a plant, the magnitude of which variable must be limited. According to the invention, the actual or present value of the signal to be limited is compared with at least one limit value signal and, as soon and as long as the difference between the two exhibits a specified algebraic sign, a correcting signal is applied through an adjusting means which overridingly influences the signal to be limited.

The limiting of regulating signals is occasionally necessary, for example, in order to protect operations or parts of plants controlled by them, in the event that the regulating signals deviate from predetermined value ranges. The method according to the invention is applicable to the technique of process regulation and control. However, certain cases to which it may be applied also arise in the technique of measurement. Regulating signals which are to be limited according to the invention may represent operational variables existing in a plant to be regulated or controlled, or rates at which these variables change.

The invention will now be described in terms of a number of preferred embodiments with reference to the accompanying drawings in which—

FIG. 3 illustrates an electrical embodiment of the invention.

Figure 1:
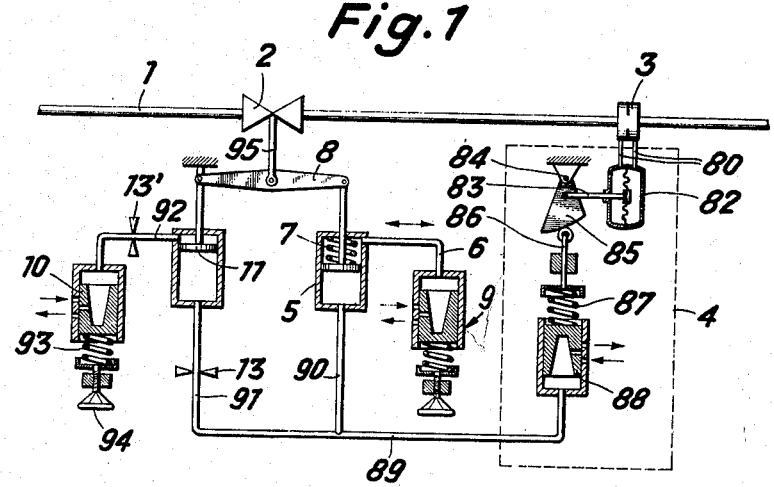
FIGS. 1 and 2 illustrate two hydraulic embodiments.

In FIG. 1, 1 designates a pipe through which for example a working medium is passed to a steam generator (not shown). The pipe 1 contains a valve 2 the flow cross-section of which is variable, and in addition a measuring restrictor 3, the latter belonging to a quantity measuring device designated generally by 4. From the restrictor 3, two pipes 80 lead to a diaphragm box 82. A rod 83 fastened to the diaphragm is connected to a cam disc 85 which is adapted to rock about a fixed point 84 and against the curve of which bears one end of a rod 86, while the other end of the said rod bears against a spring 87. In turn, the spring 87 is supported on a control piston 88, from the cylinder of which leads a pressure medium pipe 89. A pipe 90 branches off from the pipe 89 and leads to a cylinder 5 containing a servo-piston 7, the piston rod of which is joined to one end of a two-armed lever 8. In the drawing, a spring is disposed above the servo-piston 7 and a pressure medium pipe 6 is connected to the cylinder 5, through which pipe variable pressure signals are transmitted to the upper side of the piston; these signals originate from a prescribed value transmitter 9 that is manually adjustable. Alternatively the desired value transmitter 9 may for example be controlled by a temperature measuring device, which measures the temperature of the working medium flowing through the pipe 1.

Another pipe 91 branches off from the pressure medium pipe 89 and leads to a piston 11, the piston rod of which is connected to the other end of the two-armed lever 8. In the pipe 91 a throttle means 13 is provided. A pressure medium pipe 92 enters above the piston 11 and similarly contains a throttle means 13'. Pressure signals emanating from a control piston 10 are passed into the pipe 92. A spring 93 is supported on the control piston 10 and its stress can be varied by a member 94 adjustable by hand. The control piston 10, spring 93, and a member 94 together constitute a lower limit signal generator for producing a lower limit signal. The piston 11 with the throttle means 13 and 13' and the limit signal generator form a limiting device. A manipulating means 95 is coupled to the lever between its two ends and operates the valve 2.

The embodiment illustrated in FIG. 1 operates in the following manner: When the working medium flows through the pipe 1, a pressure drop occurs in the measuring restrictor 3 and through the members 82 to 88 this pressure drop is converted into a pressure actual value signal. This signal may for example be proportional to the amount flowing through the restrictor 3. The actual value rate of flow signal thus obtained is compared in the cylinder 5 with the prescribed value signal fed through the pipe 6 and any difference between the two signals is converted by stress on the spring 7 into a regulating signal which acts through the lever 8 on the valve 2. This is a simple proportional regulation with variable prescribed value. In normal operation the actual value signal coming from the measuring device 4 exceeds the lower limit signal produced by the generator 10. The piston 11 is then in its top position in the drawing, and the left end of the lever 8 forms a fixed fulcrum. The adjusting member 95 of the valve 2 is then controlled exclusively by the difference between the actual value signal and the prescribed value signal developed in generator 9.

If the actual value signal should fall below the lower limit signal of generator 10, the piston 11 will begin to move downwards, namely at a speed which is dependent on the difference between the actual value signal and the lower limit signal, and also on the adjustment of the throttle means 13 and 13'. The piston 11 comes to rest when the pressures on both sides of its two end faces are equal, under which condition the amount flowing through in the pipe 1 corresponds to the minimum quantity set by the lower limit signal generator 10. If the prescribed value signal in the pipe 6 rises slightly, the servo-piston 7 moves downwards, the amount flowing through in the pipe 1 becomes larger, and thus also the actual value signal increases. In consequence, the piston 11 moves upwards again and this continues until the actual value signal and the bottom limiting signal are equal or the piston 11 has reached the top limit.

As soon as the prescribed value signal in the pipe 6 falls below the limiting signal of generator 10, the latter signal determines the actual value of the amount flowing through the pipe 1. This actual value is thus forced to exceed the amount corresponding to the prescribed value signal of generator 9. The right-hand end of the lever 8 then moves upwards in the drawing, but this is overcompensated by the greater movement of the piston 11 downwards. The lower limit signal acting on the left-hand end of the lever thus controls the regulated quantity notwithstanding the prescribed value signal acting on the right-hand end of the lever.

Figure 2:
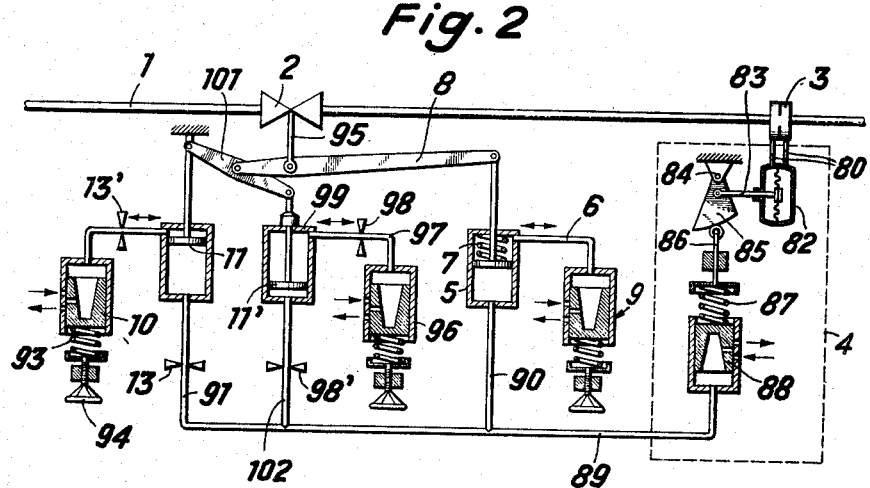

FIG. 2 illustrates an embodiment of the invention similar to that illustrated in FIG. 1, but in addition to the lower limit signal generator 10 there is provided another signal generator 96 for producing an upper limit signal. The signal generator 96 is constructed in the same way as the signal generator 10. It connects to a cylinder 99 via an hydraulic signal pipe 97 having a throttle means 98. A piston 11' is adapted to slide in this cylinder and its piston rod is connected to the right-hand end of a two-armed lever 101, while to the other end of the said lever the piston rod of the piston 11 is connected. The fulcrum of the two-armed lever 101 is joined to the left-hand end of the two-armed lever 8, which as in the example illustrated in FIG. 1 operates the valve 2 through the adjusting means 95. Another pipe 102 is branched off from the pressure medium pipe 89, and leads to the cylinder 99 through a throttle means 98'.

In normal operation, when the actual value signal constituted by the pressure in pipe 89 is greater than the lower limit signal of generator 10 and smaller than the upper limit signal of generator 96, the pistons 11 and 11' assume the position illustrated in FIG. 2, and the left-hand end of the two-armed lever 8 forms a fixed fulcrum, so that the valve 2 is controlled only in accordance with the difference between the actual value signal in the pipe 90 and the prescribed value signal in the pipe 6.

If the actual value signal or the prescribed value signal should drop below the lower limit signal, the piston 11 acts in similar manner to the arrangement described in FIG. 1, through the two levers 101 and 8, on the adjusting member 95, while the piston 11' remains in its bottom position as illustrated and the lever 101 rotates about its right-hand end. The piston 11' acts similarly but conversely. When the actual value signal or the prescribed value signal exceeds the upper limit signal produced by the generator 96, the piston 11 remains in the top position illustrated and the lever 101 rotates about its left-hand end.

In the example illustrated in FIG. 3, in which electrical means are used, the temperature of a heated flowing medium is to be kept constant by varying the amount flowing through, with the further proviso that the amount flowing through must not drop below a determined value. This further condition is for example to be fulfilled in forced circulation steam generators, in order to avoid irregularity in the flow of working medium in parallel pipe lengths.

In a pipe 1' traversed by the medium to be heated, a feed valve 2' is provided, and also a measuring restrictor 3' which is part of a quantity measuring device generally indicated at reference character 60. Downstream of the measuring restrictor 3', viewed in the direction of flow of the medium, there is disposed the heated portion 103 of the pipe 1', and at the outlet end of portion 103 there is provided a temperature measuring device 50. The temperature measuring device consists of a rod 104 which has a low coefficient of thermal expansion, and which is joined fast to the pipe at one end while its other end is articulated to a two-armed lever 105. The two-armed lever is supported at one end on the pipe, so that in accordance with the variations in the length of the pipe produced by variations in the temperature of the medium, the free end of the lever 105 can perform movements. The temperature measuring device 50 contains a voltage generator which consists of two coils 51 and a third coil 52. A reference alternating voltage $U_r$ is connected to the two coils 51 in opposite polarities, in such a way that two oppositely directed alternating magnetic fields are formed. The third coil 52 is mechanically coupled to the free end of the lever 105 and is disposed to be movable in relation to the two coils 51 in such a manner that the voltage induced in it varies with its movement. The amplitude of the induced voltage is dependent on the position of the coil 52 in relation to the other two coils 51, and the phase of the voltage changes by 180° on passing through the zero point. The zero point of the voltage is present when the coil 52 is positioned symmetrically to the two coils 51. The voltage induced in the coil 52 is taken off through two flexible conductors and constitutes a signal representative of actual temperature of the medium flowing out of pipe section 103.

A prescribed value signal generator 71 is constructed according to the same principle as the voltage generator in the measuring device 50. In generator 71, the movable coil, in which a voltage is induced, is connected to a member 72 which is adjustable by hand so that the prescribed value can be varied in accordance with adjustment of member 72. By connecting in opposition the actual value signal generator in the temperature measuring device 50 and the prescribed value signal generator 71, a regulating signal is formed. This signal, after passage through an amplifier 73, acts as regulating voltage on an adjusting motor 53. The latter consists of a ferromagnetic annular rotor without winding and a stator with two windings displaced from each other by 90°. The regulating voltage is connected to one of the two stator windings and the reference voltage $U_r$, displaced 90° in phase by means of a condenser, is connected to the other. The annular rotor rotates at an angular speed which is proportional to the amplified regulating voltage. If the phase of the regulating voltage changes by 180°, the motor changes its direction of rotation. A pinion 106 is provided on the shaft of the motor 53 and is in engagement with a toothed rack 107, the extension of which forms the adjusting means of a feed valve 2'.

The measuring restrictor 3' is connected through pipes 74 to a diaphragm box 81. The diaphragm is connected through a rod 108 to a rockable cam disc 75, on the curved section of which a rod 76 is supported which is connected to a coil 77 corresponding to the coil 52 in the temperature measuring means 50. In addition, adjacent the coil 77, there are provided two coils 78 corresponding to the coils 51 of the temperature measuring means 50, the said coils 78 also being connected in the same way as the coils 51 and being connected to the reference voltage $U_r$. The quantity measuring device 60 has associated with it a prescribed value signal generator 61, which is constructed in the same way as the prescribed value signal generator 71 for the temperature measuring device 50. An integrating device 62 is also associated with the quantity measuring device 60 and the prescribed value signal generator 61. Device 62 comprises a motor 63 and a voltage transmitter 64. Devices 60, 61, and 62 form a limiting device. The voltage transmitter 64 is constructed in the same way as the voltage generator of the temperature measuring device 50. The motor 63 is constructed in the same way as the adjusting motor 53 for the feed valve 2'. Here again, the quantity measuring device 60 and the prescribed value signal generator 61 are connected in opposition, and the difference signal resulting therefrom is transmitted to the integrating device 62. The annular rotor of the motor 63 is likewise provided with a pinion 111, which engages in a toothed rack 112, which is connected to the movable coil 110 of the voltage generator 64. The flexible conductors of the coil 110 are connected in opposition with one of the two conductors leading to the amplifier 73.

If the actual value voltage signal delivered by the quantity measuring device 60 is greater than the limiting voltage signal developed in the prescribed value signal generator 61, which corresponds to normal operation, the motor 63 will be at rest against the bottom stop 113. The voltage induced in the voltage transmitter 64 is then zero or constant, depending on the position of the stop 113. If the amount flowing through in the pipe 1' falls below the permissible limit value, the rotary magnetic field induced by the two stator windings in the motor 63 changes its direction of rotation. The rotor begins to turn in the clockwise direction, and the voltage induced in the voltage transmitter 64 varies continuously to give a correcting voltage signal. On the control signal formed by the difference between the voltages from the temperature measuring device 50 and of the desired value transmitter 71 there is superimposed an additional correcting voltage impulse originating from the limiting device 60, 61, 62 and generated in the coil 110. The adjusting motor 53 thus also turns the feed valve 2' until the minimum flow-through amount has been attained once more.

The greatest possible voltage which the integrating device 62 can give up is greater than the greatest differential voltage between the extreme values of the measuring device 50 and the prescribed value signal generator 71. The embodiment illustrated in FIG. 3 affords the advantage that no moving contacts are used. By operational magnitudes and regulating magnitudes are also to be understood ratios of different magnitudes.

Broadly therefore the invention, as applied to process control, provides for controlling a variable of a system to an adjustably fixable level without allowing it to transgress an adjustably fixable limit. Thus in the embodiments of FIGS. 1 and 2, the variable is the rate of flow of the medium through the line 1. This variable is held to a level adjustably fixable at the device 9, without however allowing it to transgress a limiting value adjustably fixed at the device 10.

This result is achieved by applying to the control of a parameter of the system of FIGS. 1 and 2 which influences that variable, namely to the setting of the valve 2, a signal (the position of the piston in cylinder 5) representative of the difference between a first signal (the pressure in line 89) which represents the variable rate of flow and a second signal (the pressure in line 6) which represents an adjustably fixable prescribed level for that rate of flow, and further by controlling the setting of valve 2 by the difference between that first signal and a third signal (the pressure in line 92) representing a limiting value on the rate of flow. Control of valve setting by the difference between these first and third signals is exercised irrespective of the difference between the first and second signals if but only if the difference between the first and third signals exhibits a specified sign, namely that represented by a preponderance of pressure in line 92 over that in line 89, and this control when exercised is exercised in the sense required to bring the pressure in line 89 to equality of that in line 92.

In the embodiment of FIG. 3 the temperature of the fluid at the output end of line 1' is held to a level adjustably fixed at the device 71, without however allowing the rate of flow through line 1' to fall below a limiting value which is adjustably set at the device 61. This result is achieved by applying to the motor 53 for control of the setting of valve 2, which influences the temperature of the fluid at the output end of line 1', a signal representative of the difference between a first signal (the output of device 50) representative of actual temperature of the fluid and a second signal (the output of device 71) representative of an adjustably fixable level for that temperature, and further by controlling motor 53 by the difference between a third signal (the output of device 60) representative of actual rate of flow of the fluid and a fourth signal (the output of device 61) representative of an adjustably fixable limiting value on that rate of flow, the control by this last named difference being exercised irrespective of any difference between the first and second signals if but only if the difference between the third and fourth signals exhibits a specified sign, and being moreover exercised as required to prevent the actual rate of flow from falling below the minimum levels set at device 61—even if the difference between the signals from devices 50 and 71 should demand it. The sign of the difference between the first and second signals in the embodiment of FIG. 3 and likewise the sign of the difference between the third and fourth signals of that embodiment takes the form of an in-phase or out-phase relation between the A.C. difference voltage and the reference voltage U$r$.

We claim:

1. In process control, the method of holding a variable of a system to an adjustably fixable level without allowing it to transgress a limiting value adjustably fixable independently of said level, said method comprising the steps of generating first, second, and third signals representative respectively of said variable, of said level, and of said value, applying to the control of a parameter of said system which influences said variable a signal representative of the algebraic difference between said first and second signals, and controlling said parameter by the difference between said first and third signals irrespective of the existence of a difference between said first and second signals only so long as the difference between said first and third signals exhibits a specified algebraic sign.

2. Apparatus for controlling a variable quantity to an adjustable prescribed value without transgressing a limiting value, said apparatus comprising means to develop a first signal representative of the variable quantity, means to develop a second signal representative of a prescribed value for the quantity, means to develop a third signal representative of a limiting value for the quantity, control means operable in opposite senses to vary the magnitude of said quantity in opposite directions, means responsive to the difference between said first and second signals to operate said control means in one or the other opposite sense according to the algebraic sign of said difference, and means responsive to differences of one algebraic sign only between said first and third signals to operate said control means in the sense required to bring said first signal to equality with said third signal.

References Cited in the file of this patent

UNITED STATES PATENTS

| 1,987,032 | Spence | Jan. 8, 1935 |
|---|---|---|
| 2,455,654 | Browne | Dec. 7, 1948 |
| 2,518,996 | Peckham | Aug. 15, 1950 |
| 2,572,253 | Fellows et al. | Oct. 23, 1951 |
| 2,632,599 | Hornfeck | Mar. 24, 1953 |
| 2,698,717 | Sisco | Jan. 4, 1955 |
| 2,842,311 | Petrie | July 8, 1958 |
| 2,889,112 | McCormack | June 2, 1959 |
| 2,898,928 | Kehoe | Aug. 11, 1959 |
| 2,973,772 | Oglesby | Mar. 7, 1961 |
| 2,979,265 | Stock | Apr. 11, 1961 |